(12) United States Patent
Ramsey et al.

(10) Patent No.: US 7,865,332 B2
(45) Date of Patent: Jan. 4, 2011

(54) SCALED EXPONENTIAL SMOOTHING FOR REAL TIME HISTOGRAM

(75) Inventors: Mark S. Ramsey, Kihei, HI (US); David A. Selby, Hampshire (GB); Stephen J. Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/620,836

(22) Filed: Jan. 8, 2007

(65) Prior Publication Data
US 2008/0167841 A1 Jul. 10, 2008

(51) Int. Cl.
*G06F 19/00* (2006.01)

(52) U.S. Cl. .......................................... 702/180; 703/2

(58) Field of Classification Search .................. 707/101; 703/2; 705/35, 36
See application file for complete search history.

(56) References Cited

U.S. PATENT DOCUMENTS

| | | | | |
|---|---|---|---|---|
| 6,229,439 | B1 * | 5/2001 | Tice | 340/506 |
| 6,483,555 | B1 * | 11/2002 | Thielemans et al. | 348/745 |
| 2007/0208437 | A1 * | 9/2007 | Schindler | 700/83 |
| 2007/0239580 | A1 * | 10/2007 | Ciampi | 705/35 |
| 2008/0109383 | A1 * | 5/2008 | Jaffe | 705/36 R |

* cited by examiner

*Primary Examiner*—Pierre M Vital
*Assistant Examiner*—Christopher J Raab
(74) *Attorney, Agent, or Firm*—Anna L. Linne; Hoffman Warnick LLC

(57) ABSTRACT

A system, method and program product for processing a stream of data events using scaled exponential smoothing for maintaining a histogram. A system is provided having: a set of histogram data that maintains a running value for each of a plurality of buckets; a bucket identification system for identifying a bucket b into which a new data event value belongs; an exponential smoothing system that applies a decay factor to the set of histogram data utilizing a first algorithm for the running value associated with bucket b, and a second algorithm for each remaining running value; and an analysis system for analyzing data event values in view of the histogram data.

14 Claims, 1 Drawing Sheet

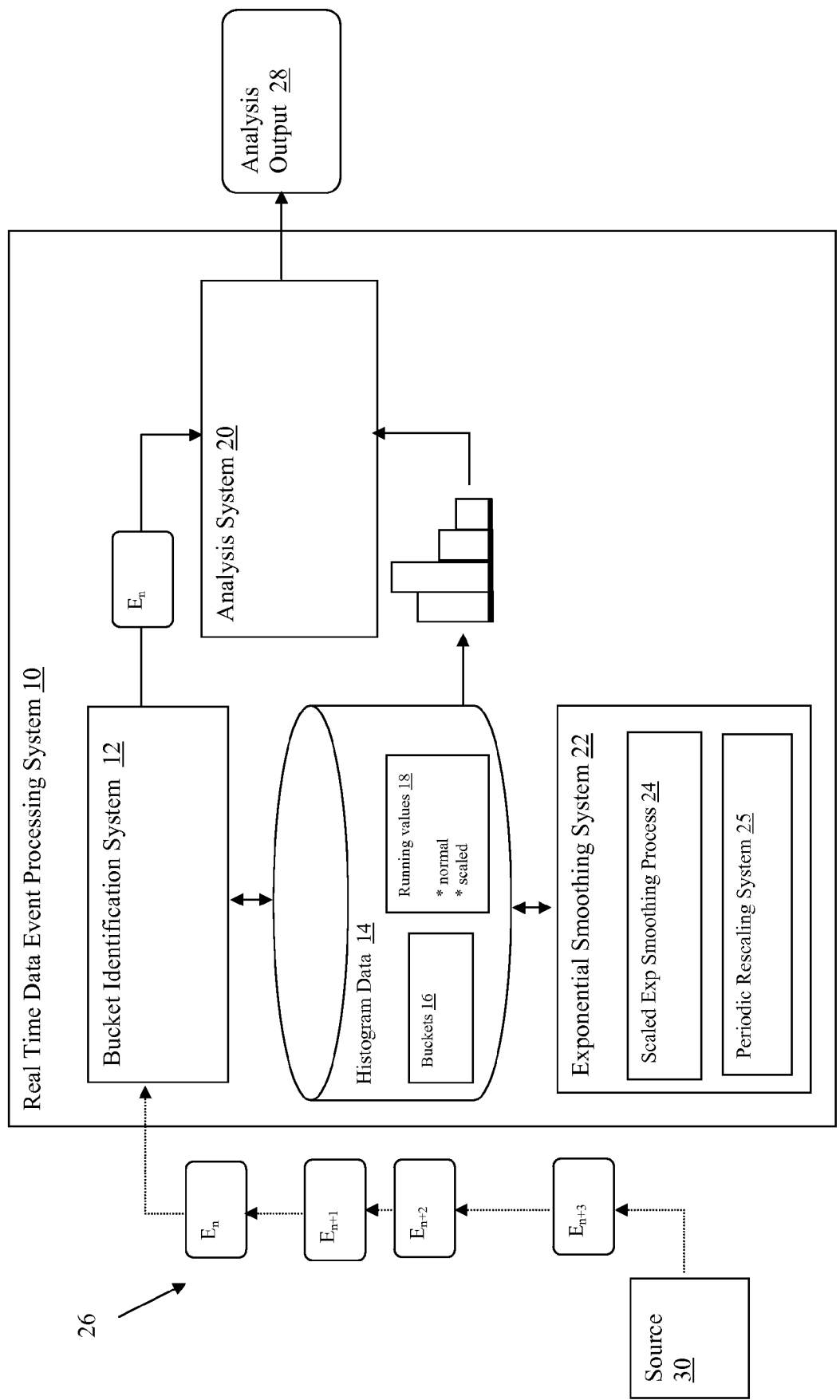

SCALED EXPONENTIAL SMOOTHING FOR REAL TIME HISTOGRAM

FIELD OF THE INVENTION

The invention relates generally to analyzing event data, and more particularly to a system and method that utilizes scaled exponential smoothing to maintain a histogram for real time data analysis.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Often, it may be necessary to examine individual data events as they occur to immediately investigate any suspect behavior. Challenges however arise when analyzing data events in real time since historical data values are typically necessary to identify trends and patterns. Namely, accessing and processing historical data can be a relatively slow process, and thus limits real time processing.

Because real time analysis techniques do not have the luxury of examining significant amounts of historical data, one approach is to use running values, in which a new statistical summary (e.g., median, mean, standard deviation, etc.) is calculated based on a previously calculated statistical summary each time a new data event occurs. Such techniques only require storage and retrieval of the previously calculated statistical summary, so real time performance is readily achievable. Unfortunately, there are many applications in which such simple statistical summaries are insufficient for providing an adequate statistical assessment of the data.

A more robust approach used for analyzing data involves the use of a histogram, which allows data frequencies to be viewed over a set of ranges. In a histogram, a plurality of data ranges or "buckets" are provided, with each bucket maintaining a count. Each count measures how many data event values fell into the associated bucket so far. Unfortunately, real time processing is challenging when histograms are utilized to analyze data because one of the key computational challenges with using histograms involves the need to incorporate some type of "decay" into the process, such that more recent values are weighted greater than older values. Using a straight forward histogram, all event values have the same weight, i.e., the very first event value has the same impact as the most recent event value.

One solution would be to use a running histogram with a defined window size. However, this requires keeping a history of the last N events (or at least what bucket they fell into), which requires too much memory for real time processing. Moreover, the decay is then too sudden at the end of the window, and the algorithm depends critically on the window width N.

Accordingly, a need exists for a real time technique that reduces some of the computations in maintaining a histogram in a real time environment.

SUMMARY OF THE INVENTION

The present invention addresses the above-mentioned problems, as well as others, by providing a system, method and program product that utilizes scaled exponential smoothing to maintain a histogram for real time data analysis. The technique involves receiving a new data event value from a data stream, identifying which bucket the new data event value belongs to, and applying an exponential smoothing algorithm to the existing value in each of the buckets. In an embodiment using scaled exponential smoothing, the existing values in the buckets not associated with the new data event value remain unchanged.

In a first aspect, the invention provides a system for processing a stream of data events, comprising: a set of histogram data that maintains a running value for each of a plurality of buckets; a bucket identification system for identifying a bucket b into which a new data event value belongs; an exponential smoothing system that applies a decay factor to the histogram data utilizing a first algorithm for the running value associated with bucket b; and an analysis system for analyzing data event values in view of the histogram data.

In a second aspect, the invention provides a computer program product stored on a computer readable medium, which when executed, processes a stream of data events, the program product comprising: program code configured for accessing a set of histogram data that maintains a running value for each of a plurality of buckets; program code configured for identifying a bucket b into which a new data event value belongs; program code configured for utilizing an exponential smoothing process to apply a decay factor to the set of histogram data utilizing a first algorithm for the running value associated with bucket b; and a second algorithm for each remaining running value; and program code configured for analyzing data event values in view of the histogram data.

In a third aspect, the invention provides a method of processing a stream of data events, comprising: providing a histogram that includes a running value for each of a plurality of buckets; obtaining a new data event value; identifying a bucket b into which the new data event value belongs; applying an exponential smoothing process that includes a decay factor to each running value, wherein the exponential smoothing process utilizes a first algorithm for the running value associated with bucket b, and a second algorithm for each remaining running value; and an analysis system for analyzing data event values in view of the histogram.

BRIEF DESCRIPTION OF THE DRAWINGS

These and other features of this invention will be more readily understood from the following detailed description of the various aspects of the invention taken in conjunction with the accompanying drawings in which:

FIG. 1 depicts a real time data event processing system in accordance with an embodiment of the present invention.

DETAILED DESCRIPTION OF THE INVENTION

Referring now to drawings, FIG. 1 depicts a real time data event processing system 10 that receives and processes a data stream 26 from a source 30. Source 30 may comprise anything that generates data, e.g., a financial institution, a network, a device, a computer program, a business, an enterprise, etc. Data contained within the data stream 26 may comprise any type of information that is created, generated, transmitted and/or received (i.e., "obtained") over time. Data stream 26 generally comprise a series of data event values ($E_n$, $E_{n+1}$, $E_{n+2}$, etc.) that can correspond to any type of data, e.g., withdrawal amounts, bit usage, etc. Although the embodiment of FIG. 1 is shown processing one stream 26, it is understood that real time data event processing system 10 can be implemented to process any number of streams, i.e., one or more.

Real time data event processing system 10 provides and maintains histogram data 14 for data stream 26. Histogram data 14 generally includes a set of buckets 16, and an associated running value 18 for each bucket. In a typical application, each bucket 16 represents a predetermined data or percentile range. For simplicity, histogram data 14 may be defined as an array H[i] having i elements, where e.g., H[1] is associated with a first predetermined range, H[2] is associated with a second predetermined range, etc. A running value 18 is thus maintained in each array element, e.g., H[1]=8.2, H[2]=7.6; H[3]=0.1; etc. As described in further detail below, two embodiments are provided, one that utilizes normal running values, and one that utilizes scaled running values.

Each time a data event value $E_n$ is received, bucket identification system 12 determines which bucket "b" the new event value belongs to. For example, if system 10 was processing a user's credit card purchases, and the data event value $E_n$ contained a very small purchase, the first bucket b=1, which represented a lowest percentile range, might be identified as the appropriate bucket. Determining the appropriate bucket b into which a new data event value $E_n$ falls can be done in any manner, e.g., by a series of compare operations, using a filter, using a binary tree algorithm, using a binary chop algorithm, etc.

Once the appropriate bucket b is identified, running values 18 are processed using exponential smoothing system 22. Exponential smoothing system 22 applies a decay factor K to each of the running values, and provides a first equation that operates on the bucket b into which the new data event value $E_n$ falls, and a second equation that operates on all of the other buckets q.

In a first illustrative embodiment that operates on normal running values, equations for implementing exponential smoothing system 22 are as follows:

$$H'[b]=K*H[b]+(1-K)*1,$$

which is applied to the identified bucket b, where H'[b] is the newly calculated running value for the identified bucket b and H[b] is the existing running value for the identified bucket b; and $$H'[q]=K*H[q]+(1-K)*0=K*H[q],$$

which is applied to all other buckets q, where H'[q] is the newly calculated running value for a bucket q and H[q] is the existing running value for bucket. Decay factor K is generally a constant between 0 and 1, with a typical value chosen close to 1. K can be chosen in any manner to control the exponential decay of the running values 18. As can be seen, using normal running values for each bucket 16 requires a computation for each bucket H[i] in the histogram data 14.

To provide enhanced computational efficiency, a scaled exponential smoothing process 24 may be utilized. In this second embodiment, rather than decaying all of the running values H[i] using decay factor K, all of the running values are inflated or scaled by a scaling factor 1/K (since 1/K is a number greater than 1). The result is that all of the buckets q (in which the new data event value $E_n$ does not belong) need not be operated on at all, i.e., for each such bucket, the new scaled running value $H_s'[q]$ equals the previous scaled running value $H_s[q]$. The application of the scaling factor 1/K may be implemented with the two equations:

$$H_s'[b]=(K*H_s[b]+(1-K))*(1/K)=H_s[b]+(1-K)/K; \text{ and}$$

$$H_s'[q]=K*H_s[q]*(1/K)=H_s[q].$$

Accordingly, scaled exponential smoothing algorithm 22 includes all of the decay features of the basic exponential smoothing algorithm, but further provides considerable computational advantages since the vast majority of the scaled running values do not require any computation, i.e., $H_s'[q]=H_s[q]$. Moreover, because (1−K)/K can be pre-computed, only a simple addition operation is required to calculate $H_s'[b]$.

Note that the overall ratios of the running values, which are typically of interest, are effectively the same using either normal running values H[i] or scaled running values $H_s[i]$. If necessary, scaled running values $H_s[i]$ calculated using scaled exponential smoothing process 24 can be converted into normal running values H[i] according to the equation:

$$H[i]=H_s[i]/\text{scale},$$

where: scale=scale*(1/K).

Eventually all of the running values 18 (either scaled or normal) will get very large, making them difficult to interpret and cause memory issues such as floating point overflows, etc. Accordingly, periodic rescaling system 25 is used from time to time to revalue each of the running values 18 in the histogram data 14 to a more convenient level. Any methodology may be utilized to rescale the running values 18, e.g., division, subtraction, etc.

Analysis system 20 provides mechanisms (e.g., algorithms, programs, heuristics, modeling, etc.) for analyzing data event values based on the histogram data 14, and for generating an analysis output 28. Illustrative types of analysis may include identifying potentially fraudulent activities, identifying trends and patterns, identifying risks, identifying problems, identifying business opportunities, etc. For example, a new data event value $E_n$ that falls into a top percentile range may indicate an unusual bank withdrawal, an unusual amount of bandwidth usage in a network, etc.

In a simple application, analysis system 20 might thus look at where a new data event value falls within the histogram data 14. If the new data event value $E_n$ falls within an extreme percentile range, analysis system 20 may issue a warning as the analysis output 28.

It should be understood that real time data event processing system 10 may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time event data processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which-when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for processing a stream of data events, comprising:
    at least one computer device, having:
    a set of histogram data that maintains a running value for each of a plurality of buckets, the running value for each bucket in the plurality of buckets representing a number of data events having an associated value in a range of values represented by the bucket;
    a bucket identification system for identifying a bucket b into which a new data event value belongs and incrementing the running value of the bucket b by a count;
    an exponential smoothing system that applies a decay factor to the histogram data utilizing a first algorithm that increments the count for the running value associated with bucket b; wherein:
        the exponential smoothing system scales each running value by a scaling factor $(1/K)$;
        the first algorithm is implemented using an equation: $H_s'[b]=H_s[b]+(1-K)/K$ where $H_s'[b]$ is a newly calculated running value for the bucket b, $H_s[b]$ is an existing running value for the bucket b, and K is a decay constant; and
        no calculation is required on each remaining bucket q; and
    an analysis system for analyzing data event values in view of the histogram data.

2. The system of claim 1, wherein the bucket identification system includes a binary tree algorithm to identify bucket b.

3. The system of claim 1, further comprising a periodic rescaling system that rescales each of the running values.

4. The system of claim 1, wherein the stream of data events comprise real time data corresponding to operations performed in conjunction with a source selected from the group consisting of: a financial institution, a network, a device, a computer program, a business, and an enterprise.

5. The system of claim 1, wherein the analysis system includes a process selected from the group consisting of: identifying potentially fraudulent activities, identifying trends and patterns, identifying risks, identifying problems, and identifying business opportunities.

6. A computer program product stored on a computer readable storage medium, which when executed, processes a stream of data events, the program product comprising:
    program code configured for accessing a set of histogram data that maintains a running value for each of a plurality of buckets, the running value for each bucket in the plurality of buckets representing a number of data events having an associated value in a range of values represented by the bucket;
    program code configured for identifying a bucket b into which a new data event value belongs and incrementing the running value of the bucket b by a count;
    program code configured for utilizing an exponential smoothing process to apply a decay factor to the set of histogram data utilizing a first algorithm that increments the count for the running value associated with bucket b; and a second algorithm for each remaining running value; wherein:
        the first algorithm is implemented using an equation:

$H'[b]=K*H[b]+(1-K)*1$, wherein $H'[b]$ is a newly calculated running value for the bucket b, $H[b]$ is an existing running value for the bucket b, and K is a decay constant; and
        the second algorithm is implemented using an equation: $H'[q]=K*H[q]+(1-K)*0=K*H[q]$,
        wherein $H'[q]$ is a newly calculated running value for every remaining bucket q, $H[q]$ is an existing running value, and K is the decay constant; and
    program code configured for analyzing data event values in view of the histogram data.

7. The program product of claim 6, wherein the program code configured for identifying the bucket b includes a binary tree algorithm.

8. The program product of claim 6, further comprising program code configured for periodically rescaling each of the running values.

9. The program product of claim 6, wherein the stream of data events comprise real time data corresponding to operations performed in conjunction with a source selected from the group consisting of: a financial institution, a network, a device, a computer program, a business, and an enterprise.

10. The program product of claim 6, wherein the computer program code configured for analyzing includes a process selected from the group consisting of: identifying potentially fraudulent activities, identifying trends and patterns, identifying risks, identifying problems, and identifying business opportunities.

11. A method of processing a stream of data events, comprising:
    providing a histogram that includes a running value for each of a plurality of buckets, the running value for each bucket in the plurality of buckets representing a number of data events
    having an associated value in a range of values represented by the bucket;
obtaining a new data event value;
    identifying a bucket b into which the new data event value belongs and incrementing the running value of the bucket b by a count;
    applying an exponential smoothing process that includes a decay factor to each running value, wherein the exponential smoothing process utilizes a first algorithm that increments the count for the running value associated with bucket b, and a second algorithm for each remaining running value; wherein:
    the first algorithm is implemented using an equation:

$H'[b]=K*H[b]+(1+K)*1$, wherein H'[b] is a newly calculated running value for the bucket b, H[b] is an existing running value for the bucket b, and K is a decay constant; and
    the second algorithm is implemented using an equation: $H'[q]=K*H[q]+(1-K)*0=K*H[q]$,
    wherein H'[q] is a newly calculated running value for every remaining bucket q, H[q] is an existing running value, and K is the decay constant; and
an analysis system for analyzing data event values in view of the histogram.

12. The method of claim 11, wherein identifying the bucket includes using a binary tree algorithm.

13. The method of claim 11, wherein the stream of data events comprise real time data corresponding to operations performed in conjunction with a source selected from the group consisting of: a financial institution, a network, a device, a computer program, a business, and an enterprise.

14. The method of claim 11, wherein analyzing includes a process selected from the group consisting of: identifying potentially fraudulent activities, identifying trends and patterns, identifying risks, identifying problems, and identifying business opportunities.

* * * * *